US005930097A

United States Patent [19]

Ceola et al.

[11] Patent Number: 5,930,097

[45] Date of Patent: Jul. 27, 1999

[54] HEAT RESPONSIVE POWER INTERRUPTING DEVICE CROSS-REFERENCE TO RELATED APPLICATIONS

[76] Inventors: Giacomo Ceola, Via Pastro 61/G, Villorba, Treviso, Italy; James K. McCusker, 12 Post La., Suffern, N.Y. 10901; Giacomo Calzavara, 128 Surrey Ct., Ramsey, N.J. 07446

[21] Appl. No.: 08/893,400

[22] Filed: Jul. 11, 1997

Related U.S. Application Data

[63] Continuation of application No. 08/539,120, Oct. 4, 1995, which is a continuation-in-part of application No. 08/274,097, Jul. 12, 1994, Pat. No. 5,590,010.

[51] Int. Cl.[6] .......... H02H 5/04

[52] U.S. Cl. .......... 361/103; 361/105; 361/115

[58] Field of Search .......... 361/93, 103, 115, 361/105, 106

[56] References Cited

U.S. PATENT DOCUMENTS

| | | | |
|---|---|---|---|
| 1,732,295 | 10/1929 | Aichele | 361/93 |
| 1,741,601 | 12/1929 | Appelberg | 361/103 |
| 1,859,125 | 5/1932 | Bethenod | 361/56 |
| 2,005,549 | 6/1935 | Klahn | 361/103 |
| 2,207,160 | 7/1940 | Rivers | 361/93 |
| 2,399,406 | 4/1946 | Toth | 361/93 |
| 2,563,066 | 8/1951 | Procopio | 361/103 |
| 2,913,552 | 11/1959 | Roberts | 361/103 |
| 3,386,004 | 5/1968 | Dwyer | 361/56 |
| 3,681,730 | 8/1972 | Fortino | 361/103 |
| 3,798,582 | 3/1974 | Schwartz | 361/93 |
| 3,872,355 | 3/1975 | Klein et al. | 317/18 |
| 4,068,203 | 1/1978 | Unger | 361/94 |
| 4,118,683 | 10/1978 | Schwarz | 361/103 |
| 4,306,210 | 12/1981 | Saur | 337/2 |
| 4,363,016 | 12/1982 | Unger | 361/18 |
| 4,369,364 | 1/1983 | Kuntermann | 301/93 |
| 4,480,246 | 10/1984 | Schmitt | 361/93 |
| 4,493,975 | 1/1985 | Yamamoto | 361/93 |
| 4,523,248 | 6/1985 | Schmale et al. | 361/93 |
| 4,528,540 | 7/1985 | Stiekel et al. | 361/103 |
| 4,659,909 | 4/1987 | Knutson | 361/93 |
| 4,687,906 | 8/1987 | Fujishima et al. | 361/103 |
| 4,801,913 | 1/1989 | Weber et al. | 361/18 |
| 4,808,965 | 2/1989 | Cenky | 337/408 |
| 4,822,290 | 4/1989 | Cauley et al. | 361/93 |
| 4,901,060 | 2/1990 | Liu | 361/93 |
| 4,951,025 | 8/1990 | Finnegan | 361/103 |
| 4,959,025 | 9/1990 | Eberhard et al. | 361/18 |
| 5,023,744 | 6/1991 | Hofsass | 361/26 |
| 5,113,045 | 5/1992 | Crofton | 361/93 |
| 5,138,185 | 8/1992 | Weinstock | 361/103 |
| 5,161,892 | 11/1992 | Shigezawa et al. | 361/93 |
| 5,248,954 | 9/1993 | Chiang | 361/93 |
| 5,261,825 | 11/1993 | Chaves | 361/93 |
| 5,266,039 | 11/1993 | Boyer et al. | 361/94 |
| 5,269,695 | 12/1993 | Opel | 361/103 |
| 5,269,697 | 12/1993 | Essex | 361/93 |
| 5,270,799 | 12/1993 | Rose | 361/103 |
| 5,278,941 | 1/1994 | Ward | 219/523 |
| 5,320,545 | 6/1994 | Brothers | 361/104 |
| 5,590,010 | 12/1996 | Ceola et al. | 361/93 |

*Primary Examiner*—Jeffrey Gaffin
*Assistant Examiner*—Stephen Jackson
*Attorney, Agent, or Firm*—Dilworth & Barrese

[57] ABSTRACT

An electric device is provided as an interface between a permanent power source (e.g., an electric wall outlet) and an electrical appliance. The device operates to interrupt electrical power to the electrical appliance in response to an increase in temperature of either the power cord plug of the electrical appliance or the terminals of the permanent power source to a predetermined temperature. The electric device detachably couples to the electric power terminals of both the permanent power source and the electrical appliance and is sensitive to the temperature at the terminals. The device includes a thermostat which rests on a thermal barrier member in thermal communication with the terminals, and is responsive to heat generated at the terminals to interrupt electrical power from the permanent power source to the appliance.

13 Claims, 6 Drawing Sheets

HEAT RESPONSIVE POWER INTERRUPTING DEVICE CROSS-REFERENCE TO RELATED APPLICATIONS

CROSS-REFERENCE TO RELATED APPLICATIONS

This is a continuation of copending application Ser. No. 539,120 filed Oct. 4, 1995, which is a continuation-in-part of application Ser. No. 08/274,097, filed Jul. 12, 1994 now U.S. Pat. No. 5,590,010.

BACKGROUND OF THE INVENTION

1. Technical Field

The present invention relates generally to a device for interrupting electrical power to an electrical appliance in response to an increase in temperature. More particularly, it relates to a device which is an electrical interface between a permanent power source and an electrical appliance and is constructed to interrupt electrical power from a conventional wall outlet to the appliance in the event that the temperature of either the appliance plug and/or the wall outlet receptacle reaches a predetermined temperature.

2. Discussion of Related Art

Devices which interrupt electrical power to an electric appliance are well known in the art. Typically, such devices are essentially circuit breakers or fuses which interrupt electrical power in the event that an electric current of a value greater than a predetermined threshold amount is delivered to the appliance. A large electrical current value relative to the requirements of a particular appliance can cause damage to the components of the appliance and may potentially create a hazardous condition. Thus, these devices typically have addressed the need to interrupt electrical power in response to a relatively large electrical current flow to an appliance.

However, such a typical fuse or circuit breaker is only responsive to electrical current and is unresponsive to the temperature condition of either the wall outlet and/or the electric appliance, specifically at the power cord plug. It has been found that an old or defective wall outlet can deteriorate to a condition which may cause the wiring of the wall outlet to reach abnormally high temperatures even with a nominal electric current flow therethrough. Such high temperature in the wiring of the wall outlet can cause arcing to occur and/or create a potential hazardous condition.

Further, some appliances, such as humidifiers, dehumidifiers, air cleaners, air conditioners, and electric heaters commonly remain plugged into a wall outlet for prolonged periods of time. In houses or buildings where the wiring is old, and as such the wiring may have deteriorated over such a period due to the heat which is generated by the appliance, the deteriorated wiring within the above mentioned wall outlet may reach abnormally high temperatures even with a nominal electric current flow therethrough creating a potentially dangerous condition.

In addition, in old or worn outlets, the plug receptacles may deteriorate to a point where the male prongs of the appliance plug may fit loosely into the female receptacles of the outlet. In appliances such as those listed above, which draw a relatively high startup current, as the appliance cycles on and off during normal use there may be some arcing at the receptacles. Arcing causes heat, and in extreme situations the male prongs may in fact melt to a point of fusing within the receptacle. As the heat increases, the potential for a hazardous condition likewise increases.

As noted above, the typical fuse or circuit breaker is only responsive to interrupt electric power to an appliance in the event of relatively high current flow therethrough. In the event of nominal current flow therethrough, the typical fuse or circuit breaker is unable to interrupt electrical power and may consequently be unable to avoid the aforementioned hazardous condition, such as overheating.

Thus, it is an object of the present invention to provide a device which interrupts electric power to an electric appliance when either the temperature of the wall outlet and/or the power cord plug of the appliance reaches a predetermined temperature.

SUMMARY OF THE INVENTION

The present invention relates generally to an electrical device operative to interrupt electrical power to an electric appliance when the wiring terminal temperature of either the wall socket and/or the power supply cord plug of the appliance exceeds a threshold temperature. In particular, it relates to a device which is an electrical interface between a permanent power source and an electric appliance and is adapted to interrupt electric power from the power source to the appliance when the wiring terminal temperature of either the power source outlet or electric appliance power cord plug exceeds a preset temperature to avoid a potentially hazardous condition.

The electrical device of the present invention preferably includes a pair of input terminals, similar to the male prongs of a power supply cord plug, adapted for releasable engagement with a source of electrical power, such as a conventional wall socket providing alternating current power. The electrical device further includes at least one pair of output terminals, similar to the female receptacles of a wall socket, adapted for releasable engagement with input terminals associated with the appliance, such as a conventional power cord plug. In the preferred embodiment, one set of input (male) terminals are provided per two sets of output (female) terminals.

A temperature sensitive circuit is provided in the electrical device of the present invention and is mounted in electrical communication between the input terminals and the output terminals. The temperature sensitive circuit includes preferably a thermostat coupled to at least one terminal of each of the pairs of input and output terminals. The circuit is operative to interrupt electrical power to the pair of output terminals when the temperature of either one of the input and output terminals equates with a first predetermined temperature. The temperatures of the input and output terminals correlate to the temperature of the wall socket and the wiring terminal temperature of the appliance at the power cord plug.

The electrical device of the present invention further includes a thermal barrier on which the thermostat is supported. The pairs of input and output terminals of the device are positioned adjacent to the body of the thermal barrier such that the temperature of the thermal barrier supporting the thermostat corresponds to the temperature at the input and output terminals. The thermal barrier is preferably constructed from a non-conductive heat insulative material such as a ceramic material and serves the dual function of insulating the electrically conductive elements within the electrical device from each other and serving as the heat conductor between the thermostat and the pairs of input and output terminals of the device.

As stated above, the thermal barrier is constructed from a material having good heat insulating properties. Due to the small confines of the device, it is necessary to have a controlled, slow heat transfer to avoid nuisance tripping of the device. Ceramic material is preferred because besides providing a controlled, slow heat transfer, ceramic material retains its insulative properties over an extended period of time and use.

Thus, when the wiring terminal temperature of either the wall socket and/or appliance plug reaches a predetermined temperature, the temperature sensitive circuit is operative to interrupt electrical power to the appliance so as to avoid a potentially hazardous condition. The temperature sensitive circuit is operative to only restore electrical power to the appliance, via its output terminals when the wiring terminal temperature of both the wall socket and appliance plug are below the aforementioned predetermined temperature. A manual reset button may be provided, or alternatively, the device may require the user to unplug the device to permit a cooling off period to reset the circuit.

In another preferred embodiment of the electric device of the present invention, an alarm may be provided in the temperature sensitive circuit that is operative to indicate when the electrical device has interrupted electrical power to the attached electric appliance. The alarm may include a visual indicator and/or an audio indicator.

BRIEF DESCRIPTION OF THE DRAWINGS

The above-mentioned features of the present invention will become more readily apparent and better understood in view of the description below, taken in conjunction with the accompanying drawings, in which.

DETAILED DESCRIPTION OF THE PREFERRED EMBODIMENTS

Figure 2:
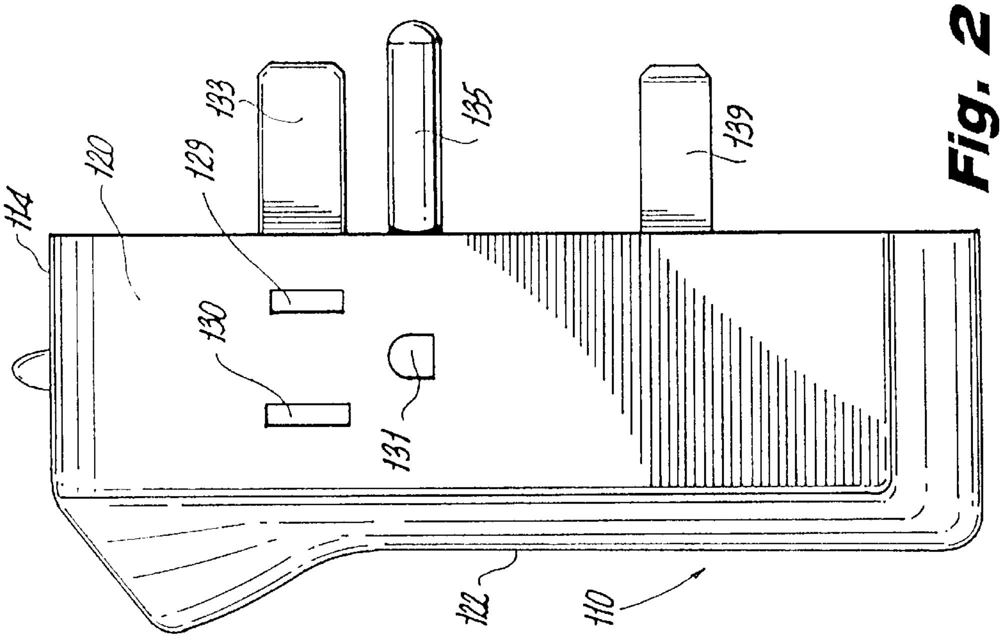
FIG. 2 is a side elevational view of the embodiment of the electrical device shown in FIG. 1.
Figure 1:
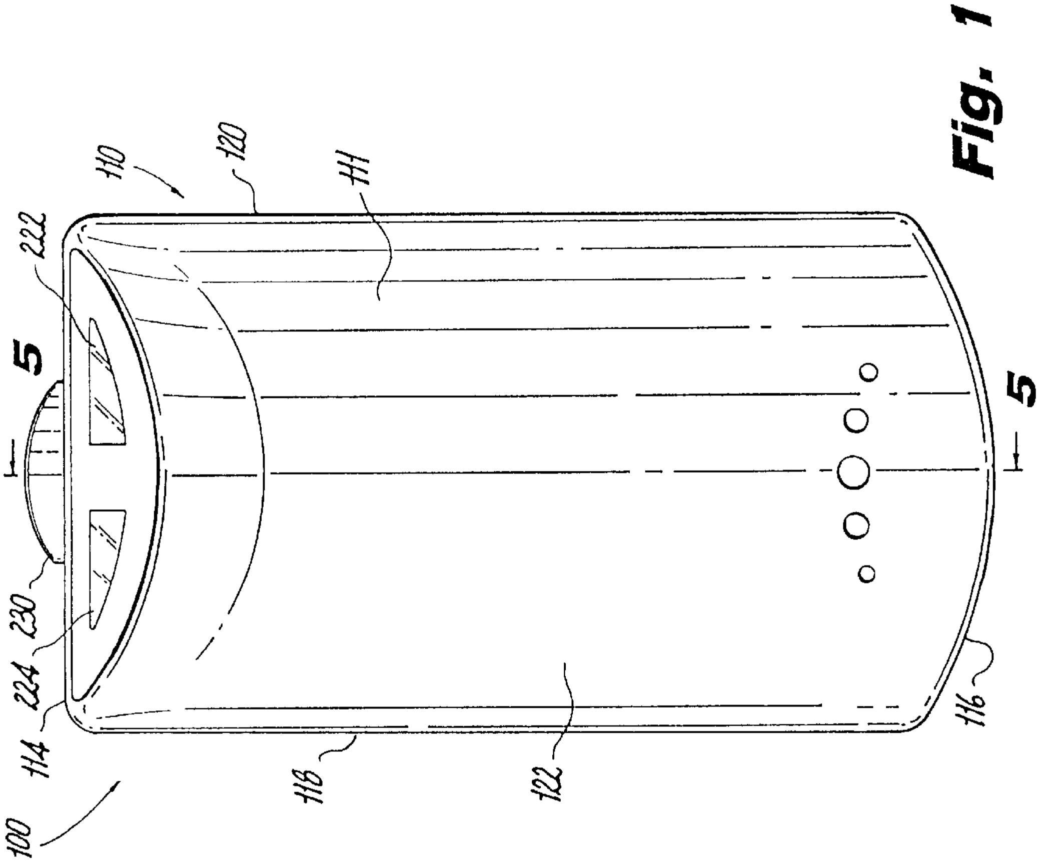
FIG. 1 is a front elevational view of one embodiment of the electrical device of the present invention.

Preferred embodiments of the presently disclosed electrical device will now be described in detail with reference to the drawings, in which like reference numerals designate identical or corresponding elements in each of the several views.

Referring to FIGS. 1 to 5, the electrical device 100 includes an outer housing 110 preferably formed of a non-conductive thermally insulating plastic or a strong thermo-set plastic material. The outer housing 110 includes a cover 111 defining a chamber 112 dimensioned to receive the electrical components of the device. The cover 111 is provided with a top wall 114, a bottom wall 116, a pair of side walls 118, 120, a front wall 122, and a rear opening 124. The rear opening 124 is covered with an enclosure plate 126 which can be secured to the housing 110 using any known means including a screw 127 and socket 128 connection. Each of the sidewalls 118 and 120 are formed having ports 129, 130, and 131 formed therein to facilitate communication between a plug body 10 of an electrical appliance 12 (see FIG. 8) and a pair of output terminals supported within the housing 110, as will be described below. The enclosure plate 126 also includes ports 137 dimensioned to permit passage of input terminals including electrical prongs 133, 134 and 135 of the electrical device 100.

Figure 5:
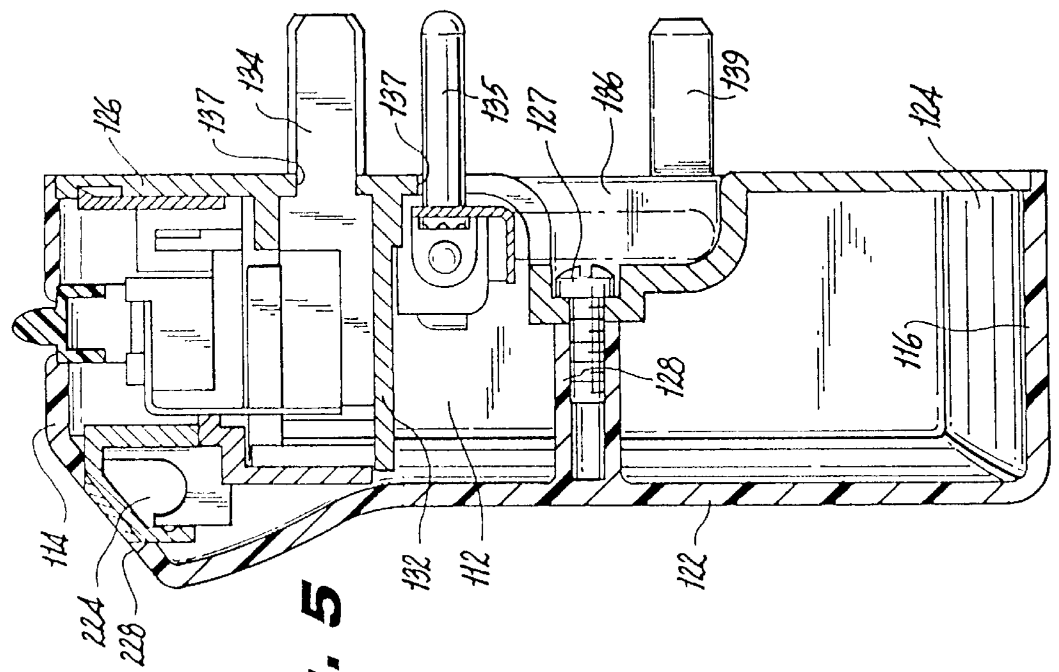
FIG. 5 is a side cross-sectional view of the embodiment of the electrical device shown in FIG. 1 taken along lines 5—5 of FIG. 1.
Figure 3:
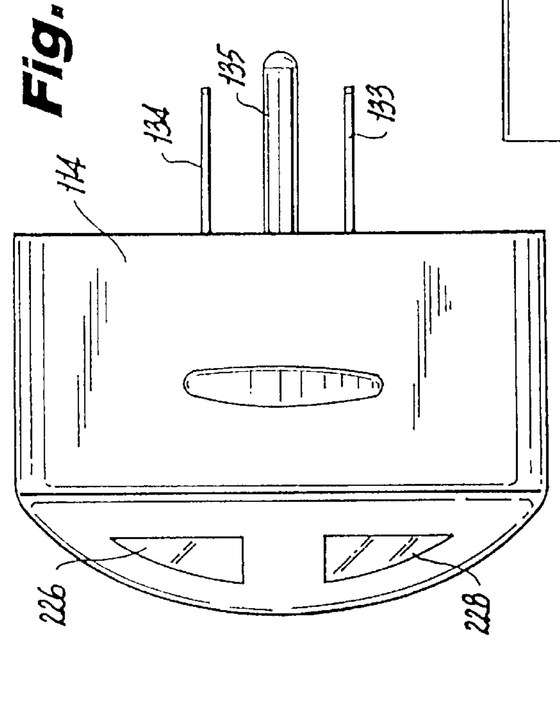
FIG. 3 is a top plan view of the embodiment of the electrical device shown in FIG. 1.
Figure 4:
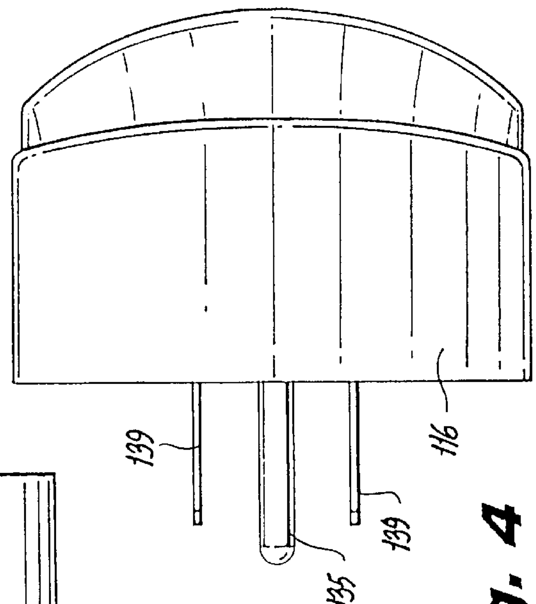
FIG. 4 is a bottom plan view of the embodiment of the electrical device shown in FIG. 1.

Referring now to FIG. 5, the enclosure plate 126 is provided with a horizontal shelf 132 extending across the chamber 112 to a position adjacent the front wall 122. The shelf 132, which can be formed integrally with the enclosure plate 126, provides support for the device components located within the outer housing 110. A pair of electrically non-conductive prongs 139 extend outwardly from a lower portion of the enclosure plate 126 from a position on the enclosure plate 126 in vertical alignment with the prongs 133 and 134. The prongs 139 are located to be received in the lower electrical socket 22 of a conventional duplex electrical receptacle 20 when the electrical prongs 133 and 134 of the device 100 are engaged with the upper electrical socket 24 of the duplex electrical receptacle 20. (See FIG. 8.) The purpose of prongs 139 is to ensure that the electrical device 100 is engaged in the upper electrical socket 24 of the duplex electrical receptacle 20 in position to cover the unprotected socket of the duplex receptacle 24 and prevent its use when electrical device 100 is in use.

The inner components of the electrical device 100 will now be described in detail with reference to FIG. 6. For ease of manufacture and assembly, the device includes five electrical conductors (136, 138, 140, 142, 144), one of which is a ground conductor 144, although any combination of conductors may be used. The conductor 136 consists of electrical prong 133 and electrically conductive extension 155 formed unitarily therewith. The electrical prong 133 extends outwardly through port 137 formed in the enclosure plate 126 to releasably engage a terminal of the socket 24 of the conventional electrical receptacle 20. (See FIG. 8.) The electrical extension 155 is configured to engage one terminal 157 of a temperature sensitive switch, such as thermostat 158, as best seen in FIG. 7.

Electrical conductor 138 consists of electrical prong 134 and a pair of electrical extensions 164 and 166. The electrical prong 134 is mounted adjacent to prong 133 and is also configured to releasably engage an input terminal of the socket 24 of conventional electrical receptacle 20. Electrical extensions 164 and 166 are formed unitarily with the electrical prong 134 and each is provided with an output terminal 148 and 150, respectively, located at a distal end thereof. Each of the output terminals 148 and 150 is mounted adjacent a respective sidewall port 129 130 such as to form one of the output terminals for each of the respective sidewall receptacles of the electrical device 100.

The electrical conductor 140 consists of a conductor body portion 168 and output terminal 152 formed unitarily therewith. Output terminal 152 is mounted adjacent to output terminal 148 within the outer housing of the device 100 to form one of the two sidewall receptacles of the device 100. The conductor body portion 168 of conductor 140 is configured to engage one of the electrical contacts 169 on the thermostat 158, as seen in FIG. 7. Electrical conductor 142 consists of conductor body portion 170 and output terminal 154, and is essentially identical to conductor 140. The output terminal 154 is mounted adjacent to the output terminal 150 to form the other of the two sidewall receptacles of the electrical device 100. The conductor body portion 170 is configured to engage a third contact 171 formed on the thermostat 158, again as seen in FIG. 7.

The ground conductor 144 consists of a ground prong 146, a central body portion 170, a pair of lateral extensions 172 and 174, and a pair of flanges 176 and 178 attached to the body portion 170. Each flange 176 and 178 has an opening 179 and 181, respectively, formed therethrough and configured to receive a pivot pin 180. The pivot pin is dimensioned to pivotally mount the ground conductor 144 between a pair of flanges 182 and 184 formed on the inner wall of the enclosure plate 126 to facilitate rotation of the ground prong 146 from a position extending outwardly from the enclosure plate 126 to a position stowed within a recess 186 in the enclosure plate 126 (as shown in phantom in FIG. 5). In the stowed position, the lateral extensions 172 and 174 of the ground conductor 144 are pivoted about pin 180 to a position blocking ports 131 formed in sidewalls 118 and 120 of the outer housing 110 to prevent entry of an appliance plug ground prong. When the ground prong 146 is in the extended position, the lateral extensions 172 and 174 are pivoted to uncover ports 131 to facilitate passage of a ground prong of an appliance plug 10. The lateral extensions 172 and 174 function as a safety device that prevents use of electrical appliances having a ground prong with wall outlets not equipped to receive a ground prong.

A thermal barrier member 160 having a planar upper surface 190 and a body 196 defining a series of passages 192, 193 and 194 is supported on shelf 132. Electrical prongs 133 and 134 extend through passage 192 and 194, respectively, and engage sidewalls thereof. Electrical conductors 136, 138, 140 and 142 are mounted in close proximity to the external walls of the body 196 such that the output terminals 148 and 152 are in contact with one end of the body 196 of the barrier member 160 and output terminals 150 and 154 are in contact with the other end of the body 196 of the thermal barrier member 160.

Preferably, the thermal barrier member 160 is constructed from an electrically non-conductive material having heat insulating characteristics, such as ceramic material. The thermal barrier member 160 serves the dual function of sensing the heat generated at the input and output terminals and communicating the heat to thermostat 158, and of insulating the electrical conductors 136, 138, 140 and 142 from each other. Because the thermal barrier member 160 is a poor conductor of heat, the heat sensed at the input and output terminals is communicated to the thermostat 158 slowly and in a controlled manner, e.g., the temperature sensed by the thermostat 158 will be only a fraction of the actual temperature at the input and output terminals. This serves to eliminate false readings and nuisance trippings.

The thermostat 158 is provided with a planar base 200 that is supported on a central portion of the upper planar surface 190 of the thermal barrier member 160. As best illustrated in FIG. 7, the output terminals 148 and 152 contact one end of the thermal barrier member 160, and output terminals 150 and 154 contact the other end of the thermal barrier member 160. Heat generated at the output terminals 148 and 152, and 150 and 154, respectively, is conducted by the thermal barrier member 160 and a fraction of the heat conducted is sensed by the thermostat 158. If the heat sensed by the thermostat 158 exceeds a predetermined temperature, the thermostat will operate to interrupt electrical power between the power source and the appliance.

Due to heat losses between the respective sidewall receptacles and the thermostat, the thermostat 158 is preferably positioned on the thermal barrier member 160 at a location substantially equidistant from the respective sidewall receptacles. This will ensure that the actual temperature at the output terminals 150 and 154 required to generate the predetermined temperature at the thermostat 158 to interrupt electrical power will be substantially the same as the actual temperature at the output terminals 148 and 152 required to generate the predetermined temperature at the thermostat 158 to interrupt electrical power. In this manner, a user can choose either output terminal without any difference in performance.

Figure 6:
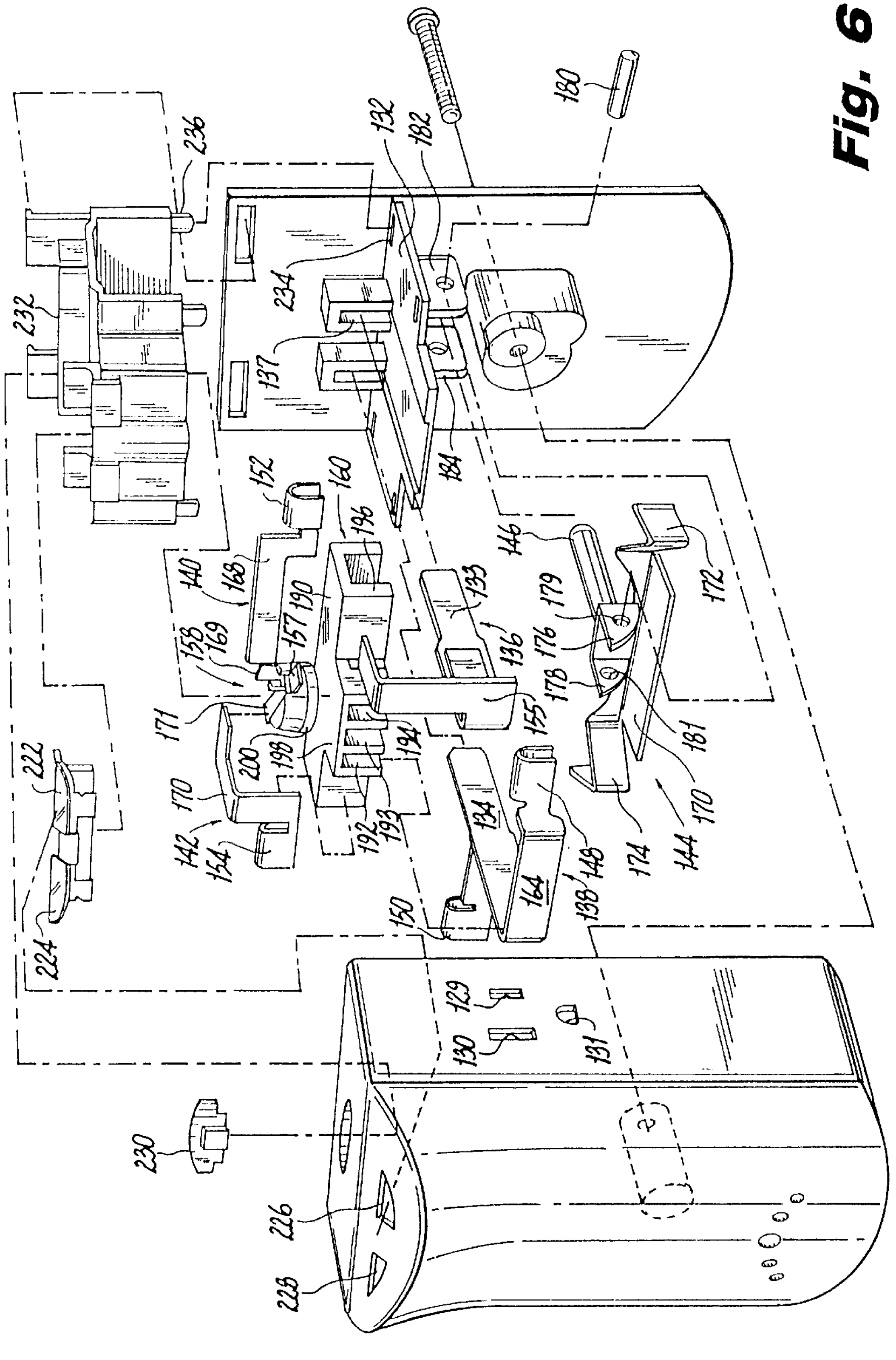
FIG. 6 is an exploded perspective view of the embodiment of the electrical device shown in FIG. 1.
Figure 7:
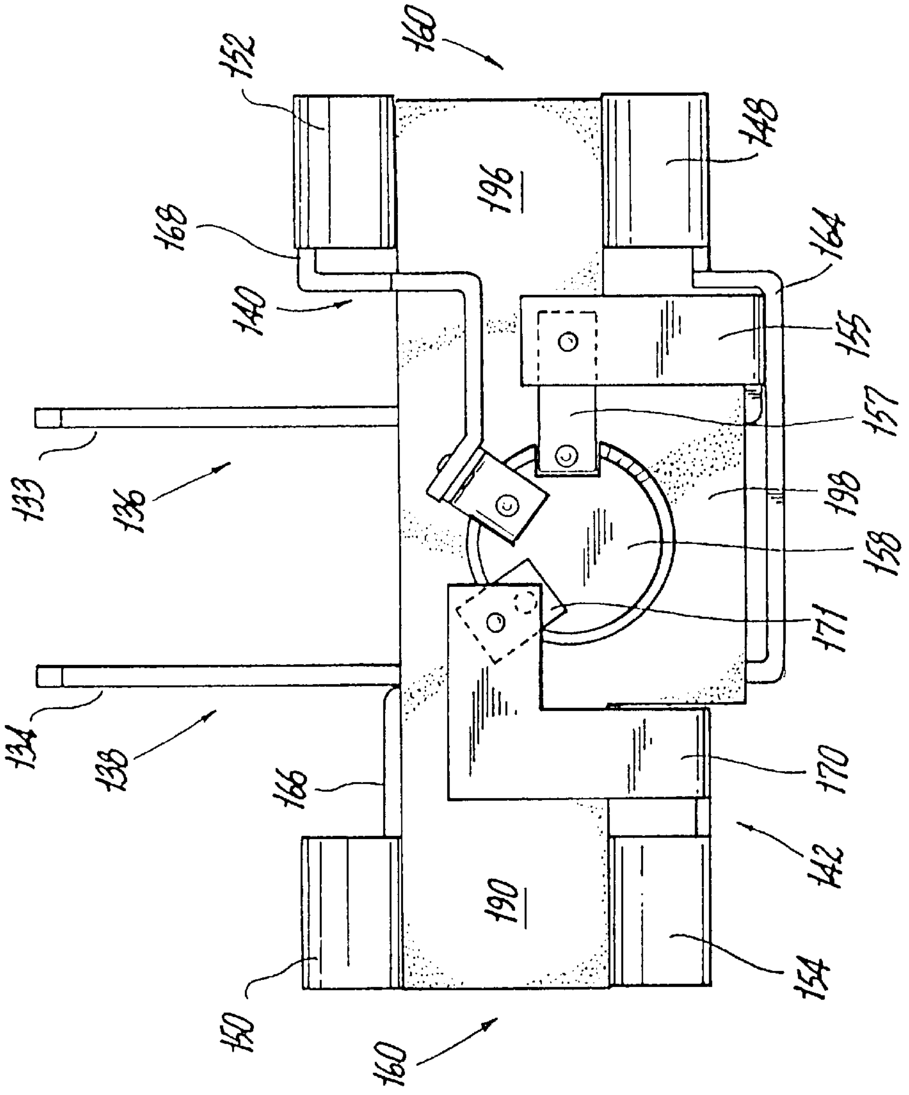
FIG. 7 is a top plan view of the electrical components and thermal barrier member.

As illustrated in FIGS. 6 and 7, the input electrical prongs 133 and 134 extend through passages 192 and 194 formed in the thermal barrier member 160 engaging sidewalls thereof at a location generally directly beneath the location of the thermostat 158. The location of prongs 133 and 134 is closer to the thermostat 158 than that of output terminals 148, 150, 152 and 154. Thus, the heat loss resulting from the conduction of heat from prongs 133 and 134 through the thermal barrier member 160 to the thermostat 158 will be less than the heat losses resulting from the conduction of heat from the output terminals 148, 150, 152 and 154 through the thermal barrier member 160 to the thermostat 158. The actual temperature required at the input terminals 133 and 134 to generate the predetermined temperature at the thermostat 158 will be less than that required at the output terminals 148, 150, 152 and 154. The device 100 is arranged in this manner because it is more desirable to maintain a lower temperature within the closed confines of the electrical wall socket outlet box than in the open atmosphere in which the appliance plug will be located. The heat has an opportunity to dissipate at the plug, but not within the outlet box, so conduction of heat at prongs 133 and 134 is designed to occur more rapidly to the thermostat than conduction from terminals 148, 152 and 150, 154 to the thermostat.

Referring again to FIG. 6, an inner housing 232 is positioned to house each of the components of the device 100 supported on shelf 132. The shelf 132 is provided with slots 234 configured to receive projections 236 extending from a lower portion of the inner housing 232 to secure the inner housing 232 in relation to the support shelf. An opening (not shown) in the top surface of the inner housing 232 facilitates passage of a thermostat reset button 230.

Figure 8:
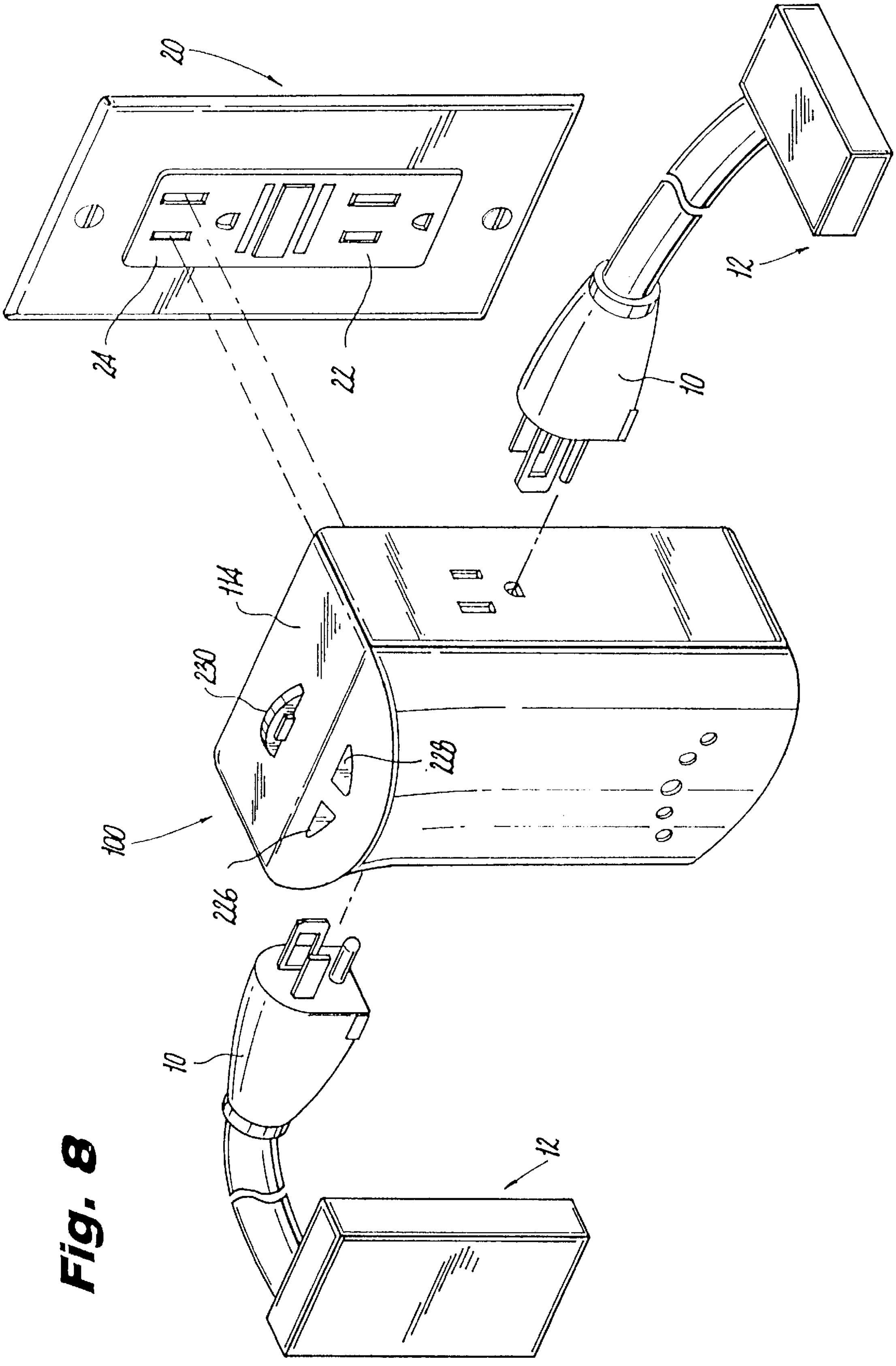
FIG. 8 is a diagrammatic perspective illustration of the electrical power interruption device in accordance with the present invention shown in an intended embodiment.
Figure 9:
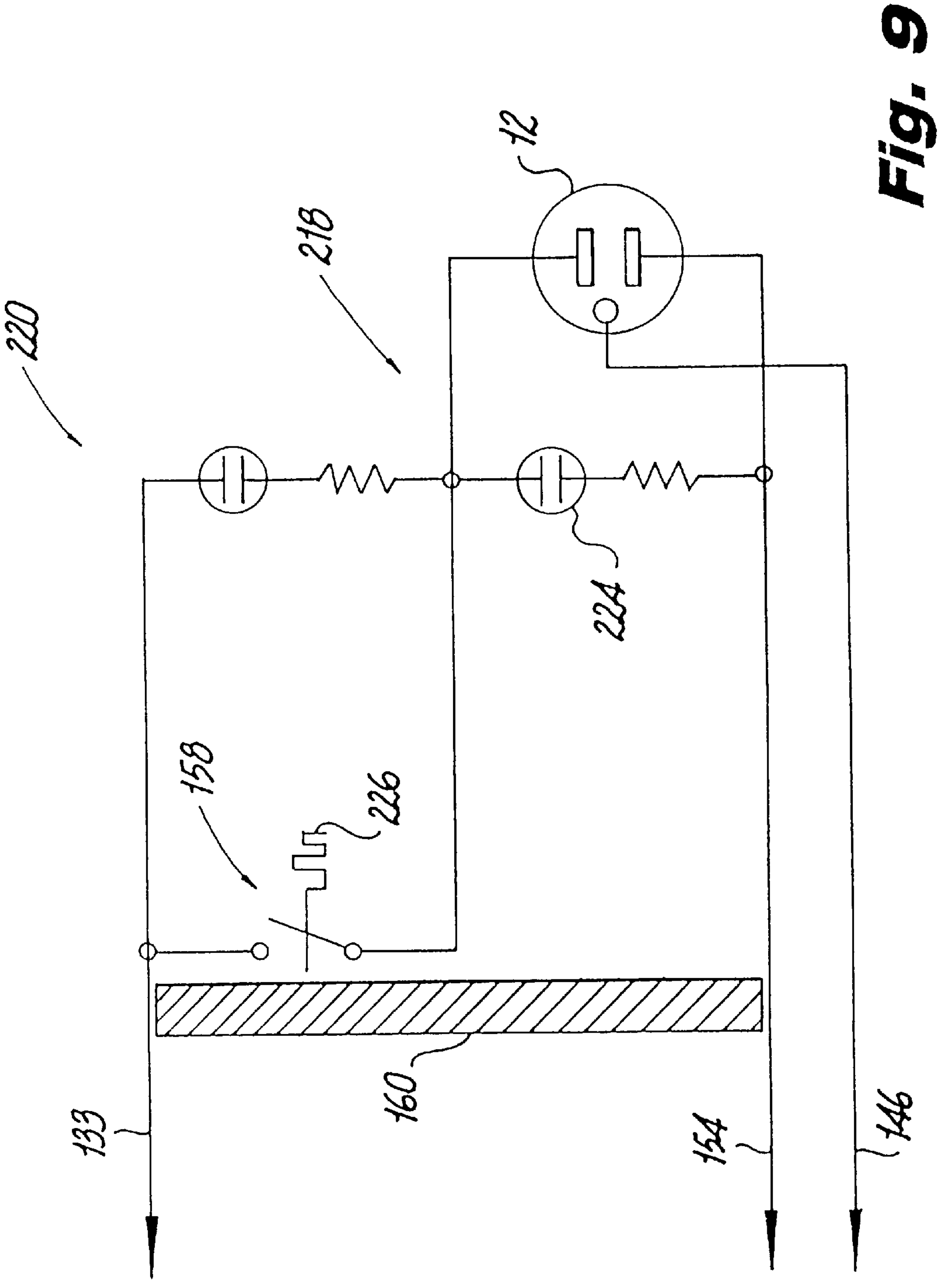
FIG. 9 is a schematic drawing of the electrical circuit of the embodiment of the electrical device shown in FIG. 1.

Referring now to FIGS. 8 and 9, the electric circuit of the electrical device 100 may include an alarm 218, which comprises a pair of indicator lights 222 and 224. The indicator lights 222 and 224 are supported in the housing and may be viewed through ports 226 and 228 formed in the top wall 114 of the housing. Light 224, the reset indicator light, indicates when the device 100 is inoperative, e.g., the device permits electric current to flow to the appliance 12. This light may be green to indicate the circuit is operating properly. Light 222, the trip indicator light, indicates that the wiring terminal temperature of either the wall socket 220 and/or the plug body 10 is too high and that the temperature sensed by the thermostat 158 is greater than the predetermined temperature. When light 222 is illuminated, the device is operating to interrupt electric current flow from wall socket 20 to the appliance 12.

It is to be appreciated that the above illustrated and described circuit scheme for the implementation of alarm 218 is for illustrative purposes only as it is envisioned numerous circuit schemes may be utilized for the implementation of the alarm 218 so as to accommodate a user's particular needs. For example, the alarm may include an audio indicator rather than a light indicator.

While the invention has been particularly shown and described with reference to the preferred embodiments, it will be understood by those skilled in the art that various modifications in form and detail may be made therein without departing from the scope and spirit of the invention. It is to be appreciated for instance, that the electrical device 10 of the present invention may be incorporated directly into the power circuitry of the power supply cord plug body of an electrical appliance. Accordingly, modifications such as those suggested above, but not limited thereto, are to be considered within the scope of the invention.

What is claimed is:

1. A device for interrupting power to an electrical appliance, the device comprising:

a pair of input terminals configured to receive electrical power from an electrical power source;

at least one pair of output terminals configured to deliver electrical power to an electric appliance;

a thermal barrier member extending between and being in thermal communication with the pairs of input and output terminals; and a temperature sensitive switch interconnecting the input and output terminals to provide electrical communication therebetween, the switch being supported on the thermal barrier member and being operative to interrupt electrical power to the appliance in response to the switch sensing a first predetermined temperature communicated from either said pair of input terminals or said pair of output terminals through the thermal barrier member.

2. A device as recited in claim 1, wherein the thermal barrier member is constructed from ceramic material and further comprises at least one passage adapted to receive and engage said pair of input terminals.

3. A device as recited in claim 1, wherein the temperature sensed by the temperature sensitive switch is less than the actual temperature at the input and output terminals.

4. A device as recited in claim 1, wherein the at least one pair of output terminals includes two pairs of output terminals, and wherein the thermal barrier member is in thermal communication with the two pairs of output terminals and the pair of input terminals.

5. A device as recited in claim 4, wherein the temperature sensitive switch is supported on the thermal barrier member at a point equidistant from the respective pairs of output terminals.

6. A device as recited in claim 1, wherein the temperature sensitive switch is a thermostat.

7. A device as recited in claim 6, wherein the thermostat is resettable.

8. A device as recited in claim 1, further comprising an alarm to indicate when electrical power to the appliance has been interrupted.

9. A device as recited in claim 8, wherein the alarm includes an audio indicator.

10. A device as recited in claim 8, wherein the alarm includes a light indicator.

11. A device for interrupting power to an electrical appliance, the device comprising:

an outer housing;

a pair of input terminals configured to releasably engage a source of electrical power;

a first and a second pair of output terminals, each pair being configured to releasably engage appliance input terminals, the first pair being spaced from the second pair;

a thermal barrier member supported within the outer housing, the thermal barrier member being in thermal communication with the pair of input terminals and the first and second pairs of output terminals; and a temperature sensitive electrical switch supported on the thermal barrier member at a position substantially equidistant from the first and the second pair of output terminals and being operative to interrupt electrical power to an appliance in response to sensing a first predetermined temperature through the thermal barrier member.

12. The device according to claim 11, wherein said outer housing further comprises a plurality of exterior surfaces, wherein said input terminals extend through a first one of said exterior surfaces for engaging the electrical power source, and said first and second pair of output terminals are disposed on at least a second one of said plurality of exterior surfaces.

13. A device for interrupting power to an electrical appliance comprising:

a pair of input terminals configured to receive electrical power from an electrical power source;

at least one pair of output terminals configured to deliver electrical power to an electrical appliance;

a thermal barrier having a plurality of passages adapted to receive and thermally engage said pair of input terminals, said thermal barrier further thermally engaging said at least one pair of output terminals; and a temperature sensitive switch interconnecting input and output terminals to provide electrical communication therebetween, the switch being supported on the thermal barrier member and being operative to interrupt electrical power to the appliance in response to the switch sensing a first predetermined temperature communicated from either said pair of input terminals or said pair of output terminals through said thermal barrier.

* * * * *